(12) United States Patent
Komatsu et al.

(10) Patent No.: US 6,285,543 B1
(45) Date of Patent: Sep. 4, 2001

(54) ELECTROLYTIC SOLUTION FOR USE IN ELECTROLYTIC CAPACITOR AND ELECTROLYTIC CAPACITOR

(75) Inventors: Akihiko Komatsu; Tetsushi Ogawara, both of Ina (JP)

(73) Assignee: Rubycon Corporation, Nagano (JP)

( * ) Notice: Subject to any disclaimer, the term of this patent is extended or adjusted under 35 U.S.C. 154(b) by 0 days.

(21) Appl. No.: 09/529,297

(22) PCT Filed: Dec. 1, 1999

(86) PCT No.: PCT/JP99/06742

§ 371 Date: Apr. 11, 2000

§ 102(e) Date: Apr. 11, 2000

(87) PCT Pub. No.: WO00/33338

PCT Pub. Date: Jun. 8, 2000

(30) Foreign Application Priority Data

Dec. 1, 1998 (JP) .................................................. 10-356955

(51) Int. Cl.$^7$ ..................................................... H01G 9/02
(52) U.S. Cl. .......................... 361/504; 361/504; 361/433; 361/525; 252/62.2
(58) Field of Search ...................... 361/504, 433, 361/523, 525, 505; 252/62.2

(56) References Cited

U.S. PATENT DOCUMENTS

| | | | |
|---|---|---|---|
| 4,580,194 | * | 4/1986 | Finkelstein et al. ................. 361/433 |
| 5,160,653 | * | 11/1992 | Clouse et al. ........................ 252/62.2 |
| 5,496,481 | * | 3/1996 | Liu ....................................... 252/62.2 |
| 6,042,740 | * | 3/2000 | Uehara et al. ....................... 252/62.2 |
| 6,058,006 | * | 5/2000 | Yoshioka et al. .................... 361/511 |

FOREIGN PATENT DOCUMENTS

| | | |
|---|---|---|
| 59-15374 | 4/1984 | (JP) . |
| 62-145713 | 6/1987 | (JP) . |
| 62-145714 | 6/1987 | (JP) . |
| 62-145715 | 6/1987 | (JP) . |
| 63-14862 | 4/1988 | (JP) . |
| 1-168017 | 7/1989 | (JP) . |
| 6-136683 | 10/1992 | (JP) . |
| 5-205978 | 8/1993 | (JP) . |

* cited by examiner

Primary Examiner—Dean A. Reichard
Assistant Examiner—Nguyen T Ha
(74) Attorney, Agent, or Firm—Merchant & Gould P.C.

(57) ABSTRACT

An electrolytic solution for use in an electrolytic capacitor, having a solution containing a solvent consisting of 20 to 80% by weight of an organic solvent and 80 to 20% by weight of water, and at least one electrolyte selected from a carboxylic acid or a salt thereof and an inorganic acid or a salt thereof, having added thereto at least on nitro compound selected from nitrophenol, nitrobenzoic acid, dinitrobenzoic acid, nitroacetophenone and nitroanisole. The electrolytic solution has a low impedance and excellent low-temperature stability, along with good working life characteristics, and it can also exhibit an excellent hydrogen gas absorption function when an electrolytic solution contains a highly increased amount of water in its mixed solvent or when an electrolytic capacitor is used under high temperature conditions.

10 Claims, 2 Drawing Sheets

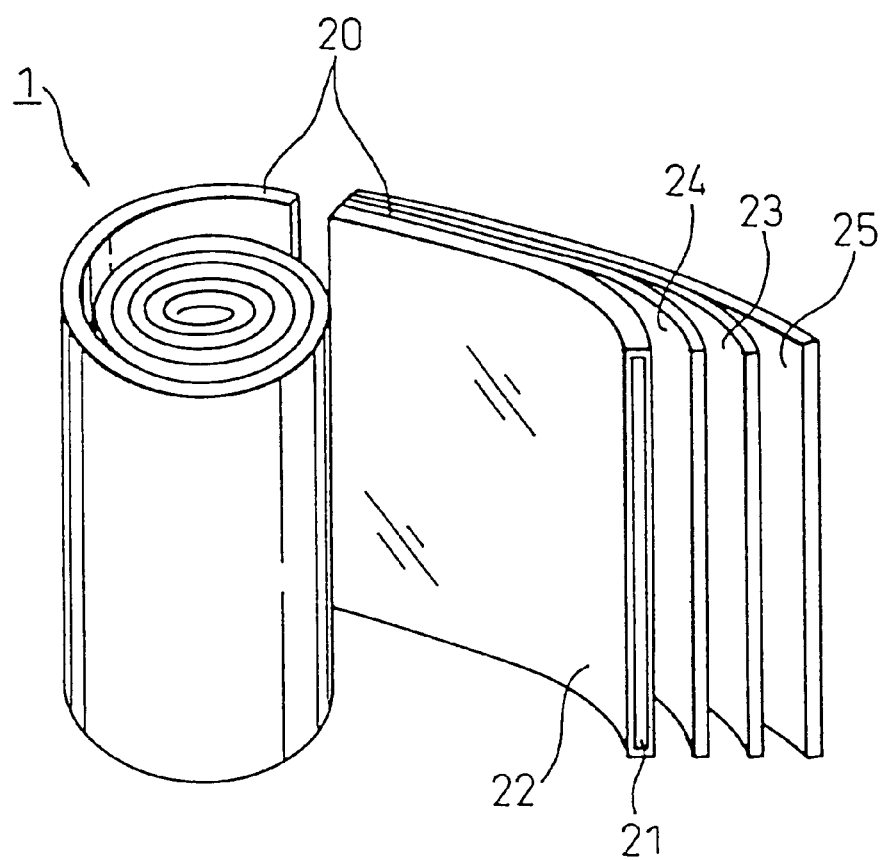

ELECTROLYTIC SOLUTION FOR USE IN ELECTROLYTIC CAPACITOR AND ELECTROLYTIC CAPACITOR

TECHNICAL FILED

The present invention relates to an electrolytic capacitor. More particularly, the present invention relates to an electrolytic solution for use in an electrolytic capacitor, which has a low impedance and excellent low-temperature stability, along with good characteristics of working life, and an electrolytic capacitor using the same, specially an aluminum electrolytic capacitor.

BACKGROUND ART

Generally, a capacitor is a general electrical part and is widely used for as a power supply circuit, a noise filter and a digital circuit component in various electric/electronic parts. Capacitors are roughly classified into electrolytic capacitors and other capacitors such as ceramic capacitors, film capacitors, etc.

Various types of electrolytic capacitors are used at present and examples thereof include aluminum electrolytic capacitors, wet tantalum electrolytic capacitors and the like. It is an aluminum electrolytic capacitor from which a particularly excellent function is expected in the present invention. Therefore, the present invention will now be described with reference to this kind of an electrolytic capacitor. The term "electrolytic capacitor" used herein refers to an aluminum electrolytic capacitor unless otherwise stated.

A conventional aluminum electrolytic capacitor can be produced typically by using an anode foil, which is made by etching a high-purity aluminum foil to thereby increase its surface area, and anodizing the surface of the aluminum foil to provide an oxide film, and a cathode foil whose surface has only been etched. The resulting anode foil and cathode foil are disposed opposite each other and an element with a wound structure is made by interposing a separator (release paper) between those foils and then the element is impregnated with an electrolytic solution. The element impregnated with the electrolytic solution is contained in a case (generally made of aluminum), which is then sealed with an elastic sealant, thus completing an electrolytic capacitor. Electrolytic capacitors also include electrolytic capacitors other than those with a wound structure.

In the above-described electrolytic capacitor, the characteristics of the electrolytic solution may be a large factor which decides the performance of the electrolytic capacitor. With the size reduction of the electrolytic capacitor, an anode foil or cathode foil having a large surface area produced by etching has been used and the resistivity of the capacitor has recently increased. Therefore, an electrolytic solution having a low resistivity (specific resistance) and thus high conductivity is required as an electrolytic solution to be used in the electrolytic capacitor.

A conventional electrolytic solution for use in an electrolytic capacitor is generally prepared by dissolving, as an electrolyte, a carboxylic acid such as adipic acid, benzoic acid, etc. or an ammonium salt thereof into a solvent prepared by adding about 10% by weight or less of water to ethylene glycol (EG) as a principal solvent. Such an electrolytic solution has a specific resistance of about 1.5 Ω·m (150 Ω·cm).

On the other hand, the capacitor is required to have a low impedance (Z) to sufficiently exert the performance thereof. The impedance is decided by various factors and, for example, it is reduced when the electrode area of the capacitor increases. Therefore, an attempt to reduce the impedance is made as a matter of course in case of a large-sized capacitor. An attempt to reduce the impedance by improving a separator has also been made. However, the specific resistance of the electrolytic solution is a large controlling factor, particularly in a small-sized capacitor.

A lower-specific resistance electrolytic solution using an aprotic organic solvent such as GBL (γ-butyrolactone) has recently been developed (see, Japanese Unexamined Patent Publication (Kokai) Nos. 62-145713, 62-145714 and 62-145715). However, the capacitor using this aprotic electrolytic solution is by far inferior in impedance to a solid capacitor using an electronic conductor having a specific resistance of 1.0 Ω·cm or less.

The aluminum electrolytic capacitor has poor low-temperature stability because of use of an electrolytic solution, and a ratio of an impedance at −40° C. to that at 20° C. (100 kHz), Z (−40° C.)/Z (20° C.), is as large as about 40 at present. Under these circumstances, it is now required to provide an aluminum electrolytic capacitor which has a low impedance and excellent low-temperature stability.

Further, water used as portion of the solvent in the electrolytic solution of the aluminum electrolytic capacitor is a chemically active substance to aluminum constituting the anode foil or cathode foil. Accordingly, there is a problem that water reacts with the anode foil or cathode foil, thereby to generate a hydrogen gas and to drastically deteriorate the performance as a capacitor.

To solve a problem such as generation of hydrogen gas found in a load life test of the electrolytic capacitor, a trial of absorbing the generated hydrogen gas has hitherto been made. For example, Japanese Examined Patent Publication (Kokoku) No. 59-15374 discloses an electrolytic solution, for use in operation of an electrolytic capacitor, produced by adding a carboxylic acid and an ammonium salt of the carboxylic acid to a solvent having added thereto 5 to 20% by weight of water, thereby to prepare a buffer solution and further adding 0.05 to 3% by weight of p-nitrophenol to the buffer solution. When using this electrolytic solution, there can be provided an electrolytic capacitor wherein low-temperature stability and a working life characteristics are improved by inhibiting the occurrence of the boehmite reaction and generation of the hydrogen gas.

Japanese Unexamined Patent Publication (Kokai) No. 63-14862 also discloses an electrolytic solution for use in the operation of an electrolytic capacitor capable of exhibiting an excellent corrosion preventing function against washing with a halogenated hydrocarbon, which is produced by adding o-nitroanisole to an electrolytic solution prepared by dissolving various organic acids, inorganic acids or salts thereof in a solvent composed exclusively of ethylene glycol. This publication describes that o-nitroanisole used as a corrosion inhibitor has a hydrogen gas absorption function, that is, a function of absorbing a hydrogen gas generated from the interior during the use of the electrolytic capacitor, thereby making it possible to inhibit an accident of safety-vent operation and a change in capacitance.

However, it has been found, as a result of the present inventors' study, that p-nitrophenol or o-nitroanisole can exhibit an initial hydrogen absorption function in the case of a conventionally used electrolytic solution of low water concentration for use in operation of an electrolytic capacitor, but cannot exhibit and maintain a satisfactory hydrogen gas absorption function when a content of water is 20% by weight or more based on the solvent in the electrolytic solution or when the electrolytic capacitor is operated under high temperature conditions for a long period of time.

DISCLOSURE OF THE INVENTION

The present invention has been accomplished to solve the above problems of the prior art, and an object thereof is to provide an electrolytic solution, for use in an electrolytic capacitor, which has a low impedance and excellent low-temperature stability, expressed by an a ratio of an impedance at low temperature to that at normal temperature, along with good characteristics of working life, and also it can exhibit an excellent hydrogen gas absorption function even when an electrolytic solution contains a highly increase amount of water in its mixed solvent or when an electrolytic capacitor is used under high temperature conditions.

Another object of the present invention is to provide an electrolytic capacitor using the electrolytic solution of the present invention, specially an aluminum electrolytic capacitor.

These objects as well as other objects of the present invention will easily become apparent from the following detailed description.

In one aspect thereof, the present invention resides in an electrolytic solution for use in an electrolytic capacitor, comprising a solution containing a solvent consisting of 20 to 80% by weight of an organic solvent and 80 to 20% by weight of water, and at least one electrolyte selected from the group consisting of a carboxylic acid or a salt thereof and an inorganic acid or a salt thereof, having added thereto at least one nitro compound selected from the group consisting of nitrophenol, nitrobenzoic acid, dinitrobenzoic acid, nitroacetophenone and nitroanisole.

In the electrolytic solution of the present invention, the nitro compound can exhibit an excellent hydrogen absorption function in combination with the other electrolytic solution component on even when the nitro compound is used alone. To obtain a more remarkable function, two or more nitro compounds are used in combination, more preferably.

When the nitro compound is added to the electrolytic solution of the present invention, the nitro compound is added in the amount of 0.01 to 5% by weight based on the total amount of the electrolytic solution.

The organic solvent to be used, along with water, to form a mixed solvent is a protic solvent, an aprotic solvent, or a mixture thereof. That is, the protic solvents and aprotic solvents may be used alone or two or more kinds of them may be optionally used in combination, respectively. The protic solvent is preferably an alcohol compound, while the aprotic solvent is preferably a lactone compound.

The carboxylic acid or salt thereof to be used as the electrolyte in the electrolytic solution of the present invention is preferably at least one selected from the group consisting of formic acid, acetic acid, propionic acid, butyric acid, p-nitrobenzoic acid, salicylic acid, benzoic acid, oxalic acid, malonic acid, succinic acid, glutaric acid, adipic acid, fumaric acid, maleic acid, phthalic acid, azelaic acid, citric acid and hydroxybutyric acid, and ammonium, sodium, potassium, amine and alkyl ammonium salts thereof.

The inorganic acid or salt thereof which is also used as the electrolyte is at least one selected from the group consisting of phosphoric acid, phosophorous acid, hydrophosphorous acid, boric acid, sulfamic acid, and ammonium, sodium, potassium, amine and alkyl ammonium salts thereof.

In addition to the nitro compound, additives selected from the group consisting of the following group:
(1) a chelate compound,
(2) saccharides,
(3) hydroxybenzyl alcohol and/or L-glutamic-diacetic acid or a salt thereof, and
(4) gluconic acid and/or gluconic lactone may be optionally contained in the electrolyte of the present invention. These additives may be used alone, or two or more kinds of them may be optionally used in combination.

In another aspect thereof, the present invention resides in an electrolytic capacitor comprising an electrolytic solution for use in an electrolytic capacitor which comprises a solution containing a solvent consisting of 20 to 80% by weight of an organic solvent and 80 to 20% by weight of water, and at least one electrolyte selected from the group consisting of a carboxylic acid or a salt thereof and an inorganic acid or a salt thereof, having added thereto at least one nitro compound selected from the group consisting of nitrophenol, nitrobenzoic acid, dinitrobenzoic acid, nitroacetophenone and nitroanisole.

BRIEF DESCRIPTION OF THE DRAWINGS

FIG. 2 is a perspective view showing the constitution of a capacitor element of the electrolytic capacitor shown in FIG. 1.

BEST MODE FOR CARRYING OUT THE INVENTION

Figure 1:
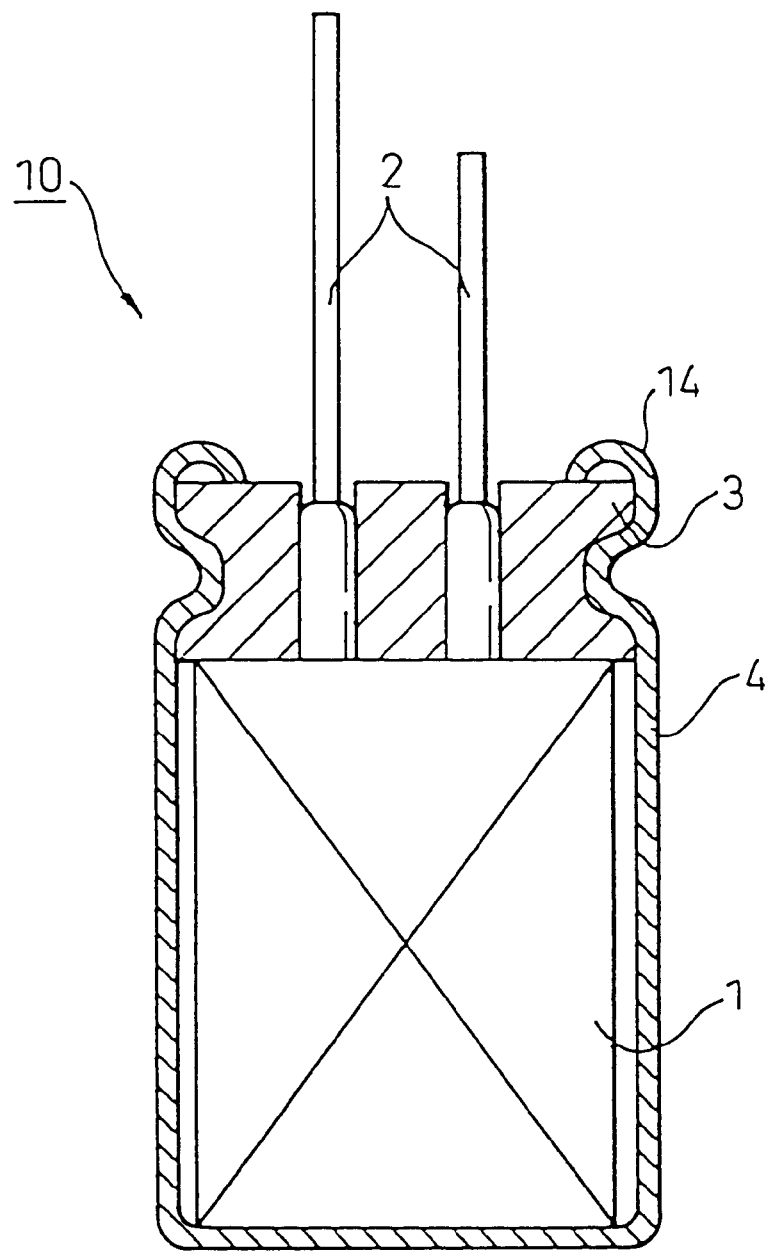
FIG. 1 is a sectional view showing one preferred embodiment of the electrolytic capacitor according to the present invention.

As described above, the electrolytic solution for an electrolytic capacitor according to the present invention is characterized by containing:
at least one nitro compound selected from the group consisting of nitrophenol, nitrobenzoic acid, dinitrobenzoic acid, nitroacetophenone and nitroanisole,
in addition to a solvent consisting of 20 to 80% by weight of an organic solvent and 80 to 20% by weight of water, and
at least one electrolyte selected from the group consisting of a carboxylic acid or a salt thereof and an inorganic acid or a salt thereof.

In the electrolytic solution for an electrolytic capacitor according to the present invention, a solvent containing a highly increased amount of water, which consists of a mixture of an organic solvent and water, is used as the solvent for dissolving the electrolyte.

As described above, protic solvents or aprotic solvents are used alone or, optionally, in combination. Examples of preferred protic solvent include alcohol compound. Specific examples of the alcohol compound used advantageously herein include, but are not limited to, monohydric alcohol such as ethyl alcohol, propyl alcohol, and butyl alcohol; dihydric alcohol such as ethylene glycol, diethylene glycol, triethylene glycol, and propylene glycol; and trihydric alcohol such as glycerin. Examples of preferred aprotic solvent include lactone compounds. Specific examples of the lactone compounds used advantageously herein include, but are not limited to, γ-butyrolactone and other intramolecular polarizable compounds. When using at least one solvent selected from the protic and aprotic solvents in the practice of the present invention, more specifically, one protic solvent may be used, one aprotic solvent may be used, plural protic solvents may be used, plural aprotic solvents may be used, alternatively a mixed solvent of at least one protic solvent and at least one aprotic solvent may be used.

In the electrolytic solution of the present invention, water is added in addition to the above-described organic solvents as the solvent component. Particularly, the present invention differs from a conventional electrolytic solution in that a comparatively large amount of water is used. According to the present invention, by using such a solvent, the solidifying point of the solvent is lowered, thereby making it possible to improve the specific resistance at low temperature of the electrolytic solution and to realize good low-temperature stability, expressed by a ratio of a resistivity at low temperature to that at normal temperature. A content of water in the electrolytic solution is preferably within a range from 20 to 80% by weight, and an organic solvent is contained as a balance. When the content of water is smaller than 20% by weight and when the content of water exceeds 80% by weight, the degree of depression in solidifying point of the electrolytic solution becomes insufficient, thereby making it difficult to obtain good low-temperature stability of the electrolytic capacitor. A preferred content of water in the solvent is within a range from 30 to 80% by weight, and a most preferred content of water in the solvent is within a range from 45 to 80% by weight.

As the electrolyte in the electrolytic solution of the present invention, an organic acid, particularly preferably a carboxylic acid or a salt thereof, and an inorganic acid or a salt thereof may be used. These electrolyte components may be used alone, or two or more kinds of them may be used in combination.

Examples of carboxylic acid which can be used as the electrolyte component include, but are not limited to, mono-carboxylic acid such as formic acid, acetic acid, propionic acid, butyric acid, p-nitrobenzoic acid, salicylic acid, and benzoic acid; and dicarboxylic acid such as oxalic acid, malonic acid, succinic acid, glutaric acid, adipic acid, fumaric acid, maleic acid, phthalic acid, and azelaic acid. Carboxylic acids having a functional group such as hydroxyl group, for example, citric acid and hydroxybutyric acid may also be used.

Examples of the inorganic acid which can also be used as the electrolyte component include, but are not limited to, phosphoric acid, phosophorous acid, hypophosphorous acid, boric acid and sulfamic acid.

As the salt of the above-described carboxylic acid or inorganic acid, various salts can be used. Preferred salts include, for example, ammonium salts, sodium salts, potassium salts, amine salts and alkyl ammonium salts. Among these salts, an ammonium salt is preferably used.

In addition, using the inorganic acid or salt thereof as the electrolyte in the practice of the present invention, depression in solidifying point of the electrolytic solution can be expected, thereby making it possible to contribute to a further improvement in low-temperature stability of the electrolytic solution. The use of the inorganic acid or salt thereof is noticeable in that the hydrogen gas absorbability (described in detail hereinafter) derived from the nitro compound used particularly in the present invention can be maintained for a long period of time.

According to the present inventors study, by using an electrolyte such as inorganic acid or salt thereof in combination with the above-described carboxylic acid or salt thereof, an effect of remarkably prolonging a working life of the electrolytic capacitor, occurs, as compared with the case where they are used alone. Furthermore, an inorganic acid-based electrolyte has hitherto been used exclusively in a medium to high-voltage (160 to 500 volts) type electrolytic capacitor in a conventional electrolytic capacitor in view of the conductivity. However, when using electrolytes in combination, like the present invention, the electrolyte can also be used advantageously in a low-voltage (lower than 160 volt) type electrolytic capacitor.

The amount of the electrolyte used in the electrolytic solution of the present invention can be appropriately determined depending on various factors such as characteristics required to the electrolytic solution and the capacitor obtained finally, kind, compositions and amount of the solvent, and kind of the electrolyte. As described above, when using the inorganic acid-based electrolyte in combination with the carboxylic acid-based electrolyte, the amount of the inorganic acid-based electrolyte contained in the mixed electrolyte can vary within a wide range, but the inorganic acid-based electrolyte is preferably contained in the amount within a range from about 0.1 to 15%, by weight, based on the total amount of the electrolyte.

The electrolytic solution of the present invention is characterized by further adding, as an additive, at least one nitro compound selected from the group consisting of a nitrophenol such as p-nitrophenol, a nitrobenzoic acid such as p-nitrobenzoic acid, a dinitrobenzoic acid, a nitroacetophenone such as p-nitroacetophenone and nitroanisole, to an electrolytic solution of the above-described specific compositions, that is, an electrolytic solution comprising an aqueous mixed solvent consisting of 20 to 80% by weight of an organic solvent and 80 to 20% by weight of water, and at least one electrolyte selected from the group consisting of a carboxylic acid or a salt thereof and an inorganic acid or a salt thereof.

In the present invention, a particularly hydrogen gas absorption function could be confirmed when using the above-described group of nitro compounds, but the actual reasons have not yet been clarified. However, it is considered, based on the present inventors' experience, that a large factor is in that substituents contained in each nitro compound exhibit the hydrogen gas absorption function at different timings. The nitro compound used herein can also have a function of inhibiting corrosion of the element caused by a function of a halogenated hydrocarbon used on washing of a printed circuit board, for example, trichloroethane (a halogen capturing function, in other words).

When the nitro compound is added to the electrolytic solution of the present invention, the nitro compound can exhibit satisfactory hydrogen gas absorption functions and halogen capturing functions even when used alone because specific compositions effective for the function of the present invention are employed in the electrolytic solution itself. According to the present inventors' finding, a more preferred function can be expected from using two or more nitro compounds in combination. It is generally recommended to use two nitro compounds in combination. The nitro compound is preferably added in the amount within a range from 0.01 to 5% by weight based on the total amount of the electrolytic solution. When the amount of the nitro compound is smaller than 0.01% by weight, an expected function is hardly obtained. On the other hand, even when the amount exceeds 5% by weight, a further improvement in expected function cannot be expected and a deleterious influence is sometimes exerted on the other characteristics.

The use of the nitro compound will be described in more detail below. The absorption function of the hydrogen gas generated on the reaction between aluminum and water is liable to be lowered with the increase in amount of water in the solvent when using the nitro compound alone, as was described in the item entitled "Background Art". This lowering tendency becomes drastic in the case where the electrolytic solution is subjected to high temperature conditions. However, problems caused by using these nitro compounds alone can be solved by using two or more nitro compounds in combination, as in the present invention. Actually, in case of the electrolytic solution of the present invention, the hydrogen gas absorbability can be maintained under high temperature conditions for a longer period of time, than in the case where these nitro compounds are used alone, by using plural nitro compounds.

An excellent function in absorption of the hydrogen gas according to the present invention could also be confirmed in a relation to the electrolyte used in combination. In a conventional electrolytic solution, the procedure of adding only one nitro compound to only a carboxylic acid-based electrolyte, or adding only one nitro compound to only an inorganic acid-based electrolyte has been employed. However, a satisfactory hydrogen gas absorption function cannot obtained by the procedure in case where the amount of water contained in the solvent is large, and the same results are obtained in an electrolytic solution wherein both of a carboxylic acid-based electrolyte and an inorganic acid-based electrolyte are present. In case of the electrolytic solution of the present invention (using only one nitro compound), the hydrogen gas absorbability could be, surprisingly, maintained for a longer period of time than the case where nitro compounds are used alone even in case of the carboxylic acid/inorganic acid mixed electrolytic solution.

The electrolytic solution of the present invention can optionally contain, as an additive, components other than those described above. Preferred additives include, for example, the following compounds.

(1) Chelate compound, for example, ethylenediamine-N,N,N',N'-tetraacetic acid (EDTA), trans-1,2-diaminocyclohexane-N,N,N',N'-tetraacetic acid, monohydrate (CyDTA), N,N-bis(2-hydroxyethyl)glycine (DHEG), ethylenediamine-N,N,N',N'-tetrakis(methylenephosphonic acid) (EDTPO), diethylenetriamine-N,N,N',N",N"-pentaacetic acid (DTPA), 1,3-diamino-2-hydroxypropane-N,N,N',N'-tetraacetic acid (DPTA-OH), ethlnediamine-N,N'-diacetic acid (EDDA), ethylenediamine-N,N'-bis(methylenephosphonic acid), hemihydrate (EDDPO), O,O'-bis(2-aminoethyl)ethyleneglycol-N,N,N',N'-tetraacetic acid (GEDTA), N-(2-hydroxyethyl)ethylenediamine-N,N',N'-triacetic acid (EDTA-OH) and others. The chelate compound is preferably added in the amount within a range from 0.01 to 3% by weight. Such a chelate compound can exert effects such as prolongation of a working life due to inhibition of the hydration reaction of an aluminum (Al) electrode foil of a low-impedance capacitor, improvement in low-temperature stability of an electrolytic capacitor (a change between an impedance at normal temperature and that at low temperature decreases because the solvent has compositions close to those corresponding to a non-frozen state), and improvement in corrosion resistance.

(2) Saccharides, for example, glucose, fructose, xylose, galactose and others. The saccharides are preferably added in the amount within a range from 0.01 to 5% by weight. These saccharides can exert effects such as prolongation of a working life due to inhibition of the hydration reaction of an aluminum electrode foil of a low-impedance capacitor, inhibition of decomposition or activation of an electrolyte (e.g. carboxylic acid) due to the addition of saccharides, and improvement in low-temperature stability of an electrolytic capacitor (a change between an impedance at normal temperature and that at low temperature decreases because the solvent has compositions close to those corresponding to a non-frozen state).

(3) Hydroxybenzyl alcohol, for example, 2-hydroxybenzyl alcohol, L-glutamic-diacetic acid or a salt thereof and others. This additive is preferably added in the amount within a range from 0.01 to 5% by weight. Such an additive can exert effects such as prolongation of a working life due to inhibition of the hydration reaction of an aluminum electrode foil of a low-impedance capacitor, and improvement in low-temperature stability of an electrolytic capacitor (a change between an impedance at normal temperature and that at low temperature decreases because the solvent has compositions close to those corresponding to a non-frozen state).

The above-described compounds (1) to (3) can exhibit various remarkable effects by adding them to the electrolytic solution of the present invention, and almost all of the effects can be expected even in case where no nitro compound is contained in the electrolytic solution. According to the present inventors' study, these excellent effects can be obtained by using at least one of the above compounds (1) to (3) in combination with gluconic acid or gluconic lactone described below.

In addition to the above-described additives (also including the case where nitro compounds are added alone), the electrolytic solution of the present invention can optionally contain:

(4) gluconic acid and gluconic lactone alone or in combination. This kind of the additive is preferably added in the amount within a range from 0.01 to 5% by weight. Gluconic acid and gluconic lactone can further exert remarkable effects such as improvement in corrosion resistance, in addition to functions, which are specific to the present invention, such as prolongation of a working life of an electrolytic capacitor, improvement in low-temperature stability and excellent hydrogen gas absorption function, by containing them in the electrolytic solution of the present invention.

In addition to the above-described additives, additives conventionally used in the field of aluminum electrolytic capacitors and other electrolytic capacitors may also be added. Preferred conventional additives include, for example, mannitol, a silane coupling agent, a water-soluble silicone and a polyelectrolyte.

The electrolytic solution of the present invention can be prepared by mixing and dissolving the above-described various components in an arbitrary sequence according to a conventional procedure or a modified procedure thereof. For example, the electrolytic solution can be simply prepared by preparing a solvent containing a highly increased amount of water as a mixture of an organic solvent and water, and optionally dissolving an electrolyte, a nitro compound and optional additives in the resulting solvent.

According to the present invention, there is also provided an electrolytic capacitor, preferably an electrolytic capacitor comprising a capacitor element formed of an anode foil, a cathode foil opposed to the anode foil and a separator disposed between the anode foil and the cathode foil, and the electrolytic solution of the present invention.

The electrolytic capacitor of the present invention is more preferably an aluminum electrolytic capacitor, and most preferably an electrolytic capacitor comprising:

a capacitor element formed by winding an anode foil consisting of an aluminum foil and an anodized film appearing on the surface of the aluminum foil, and a cathode foil made of the aluminum foil, via a release paper, so that surfaces of both foils face each other;

an electrolytic solution of the present invention;

a case or casing containing the capacitor element and the electrolytic solution; and an elastic sealant with which an opening portion of the case is sealed.

In the electrolytic capacitor of the present invention, because the electrolytic solution of the present invention is used, the functions of improving low-temperature stability based on a mixed solvent of an organic solvent and water, the hydrogen gas absorption function based on addition of a nitro compound, and prolongation of a working life and reduction of impedance based on inhibition of the hydration reaction due to use of a specific electrolyte, can be attained.

The electrolytic capacitor of the present invention is preferably formed in such a manner that a capacitor element is formed by winding an anode foil, wherein the surface of an etched aluminum foil is anodized, and a cathode foil made of the etched aluminum foil, via a release paper, so that surfaces of both foils face each other, and an electrolytic solution of the present invention are contained in a case, and an opening portion of the case containing the capacitor element is sealed with an elastic sealant.

FIG. 1 is a sectional view showing one preferred embodiment of the electrolytic capacitor of the present invention, and FIG. 2 is a perspective view, enlarged partially in the thickness direction, which shows a capacitor element of the electrolytic capacitor shown in FIG. 1. Although the embodiment shown in the drawings is an electrolytic capacitor with a wound structure, various changes and modifications may be made in the electrolytic capacitor of the present invention without departing from the spirit and scope thereof. Of course, electrolytic capacitors other than the electrolytic capacitor with a wound structure are included in the scope of the present invention.

The illustrated electrolytic capacitor 10 is a chip-shaped aluminum electrolytic capacitor and has such a structure that a capacitor element 1 impregnated with an electrolytic solution is contained in a metal case 4 and an opening portion of the case 4 is sealed with a sealant 3. The capacitor element 1 contained in the metal case is in the form of a wound sheet-like laminate 20. The laminate 20 comprises, as shown in the drawing, an aluminum foil (anode) 21 having an oxide film 22 over the entire surface thereof, an aluminum foil (cathode) 23, a first separator (release paper) 24 interposed between these electrodes, and a second separator (release paper) 25. The first separator 24 and the second separator 25 may be the same or different, but are preferably the same in view of the production process and cost. The second separator 25 may be formed from a usual insulating film, if it is necessary. The capacitor element 1 is impregnated with an electrolytic solution.

In the illustrated electrolytic capacitor 10, the sealant 3 has a lead wire-penetrating hole for inserting a lead wire 2, thereby to conduct sealing, therein. The end of the opening portion of the case 4 is provided with a curl 14 to enhance a sealing strength of the sealant.

The electrolytic capacitor shown in FIGS. 1 and 2 can be produced, for example, by the following procedure. First, an anode foil, wherein an oxide film is provided over the entire surface, by anodizing the surface, of a high-purity aluminum foil as a raw material, and a cathode film whose surface area is increased by etching the surface are made. Then, the resulting anode foil and cathode foil are disposed facing each other and a separator (release paper) is interposed between those films to form a laminate, thereby making an element with a structure obtained by winding this laminate, that is, a capacitor element. Subsequently, the resulting capacitor element is impregnated with an electrolytic solution and the capacitor element impregnated with the electrolytic solution is contained in a case (generally made of aluminum), as described above, and then an opening portion of the case is sealed with a sealant. Two lead wires are inserted into a lead wire-penetrating hole of the sealant, thereby to completely prevent leakage of the electrolytic solution.

The electrolytic capacitor of the present invention will be described in more detail hereinafter.

The aluminum foil used as the anode foil and cathode foil is preferably an aluminum foil having high purity of 99% or more. The anode foil can be preferably formed by electrochemically etching the aluminum foil, anodizing it to form an oxide film on the surface, and attaching a lead tab for connecting an electrode. The cathode film can be formed by etching the aluminum foil and attaching a lead tab for connecting an electrode. This cathode foil may not be anodized.

The capacitor element can be obtained by winding the anode and cathode foils, formed in the above steps, via the above-described release paper while the surfaces of both foils face each other.

The release paper used in the production of the capacitor element is not specifically limited, but is preferably a paper produced by using as a raw material a naturally produced cellulose material, for example, Manila hemp and raw pulp. As the release paper, for example, there can be advantageously used a paper produced by passing the raw pulp through a dust removing process, a washing process, a beating process and paper-making process. A paper derived from synthetic fibers can also be used, however, such a paper is not preferred because it is inferior in heat resistance and corrosion of the capacitor is caused by halogen ions contained in the paper.

The sealant used in the electrolytic capacitor of the present invention can be formed from various materials used usually as far as the material has high hardness and proper rubber elasticity, and it is also impermeable to an electrolytic solution and has good airtightness for the sealant. Preferred sealant material includes, for example, elastic rubber such as natural rubber (NR), styrene-butadiene rubber (SBR), ethylene-propylene terpolymer (EPT), and isobutylene-isoprene rubber (IIR). The isobutylene-isoprene rubber (IIR) is preferably used because the airtightness is high and the electrolytic solution does not penetrate in the form of vapor. Vulcanized IIR having more excellent heat resistance, for example, sulfur-vulcanized, quinoid-vulcanized or resin-vulcanized IIR is used more preferably, and the resin-vulcanized IIR is particularly preferred.

In the practice of the present invention, a hybrid material obtained by laminating a resin material plate having sufficient airtightness and strength (e.g. fluorine-contained resin plate such as PTFE plate) can be advantageously used in place of the above-described sealant material.

EXAMPLES

The following Examples further illustrate the present invention in detail. Note that these examples are to be construed in all respects as illustrative and not restrictive.

Example 1

An aluminum electrolytic capacitor with a wound structure was produced in accordance with the following procedure.

First, an aluminum foil was electrochemically etched, followed by anodizing to form an oxide film over the entire surface of the aluminum foil, and then a lead tab for connecting an electrode was attached to make an aluminum anode electrode. Another aluminum foil was also electrochemically etched and a lead tab for connecting an electrode was attached to make an aluminum cathode electrode. Subsequently, a capacitor element was made by interposing a separator (release paper) between the anode foil and the cathode foil, followed by winding. The capacitor element was impregnated with an electrolytic solution whose compositions are shown in Table 1 below and contained in an aluminum case with a base so that the lead tab for connecting an electrode protrudes out of the case, and then an opening of this case was sealed with an elastic sealant to make an electrolytic capacitor with a wound structure (10 WV–1000 μF).

The specific resistance at 30° C. of the electrolytic solution used in this example was measured to obtain measured values as described in Table 1 below. After an impedance at low temperature (–40° C.) and an impedance at normal temperature (20° C.) of the electrolytic capacitor thus obtained were measured, an impedance ratio (ratio Z) expressed as a ratio of the respective measured values was determined at different frequencies: 120 Hz and 100 kHz. As a result, measured values as described in Table 1 below were obtained. To evaluate characteristics of working life of the respective electrolytic capacitor, an initial value (characteristic value immediately after production of a capacitor) and a characteristic value after the capacitor was allowed to stand at high temperature (lapse of 1000 hours at 105° C.) under application of a rated voltage were measured with respect to the capacitance, tan δ and leakage current. As a result, measured values as described in Table 1 below were obtained.

Examples 2 to 10

The same procedure as in Example 1 was repeated, except that in this example, compositions of the electrolytic solution were changed as described in Table 1 below. The results of characteristic tests are summarized in Table 1 below.

Comparative Examples 1 to 3

The same procedure as in Example 1 was repeated, except that in this example, for the comparison purpose, a nitro compound was eliminated from the electrolytic solution and that compositions of the electrolytic solution were changed as described in Table 1 below. The results of characteristic tests are summarized in Table 1 below.

TABLE 1

| Example No. | Compositions of electrolytic solution (% by weight) | | Specific resistance at 30° C. [Ω · cm] | Ratio Z 120 Hz [–40/20° C.] | Ratio Z 100 kHz [–40/20° C.] | Initial value Capacitance [μF] | Initial value tan δ [%] | Initial value Leakage current [μA] | After 3000 hours at 105° C. Capacitance [μF] | After 3000 hours at 105° C. tan δ [%] | After 3000 hours at 105° C. Leakage current [μA] | Appearance |
|---|---|---|---|---|---|---|---|---|---|---|---|---|
| Example 1 | Ethylene glycol | 25.0 | 28 | 1.1 | 4.6 | 1044 | 5.4 | 7.7 | 898 | 6.2 | 2.3 | |
| | Water | 68.0 | | | | | | | | | | |
| | Ammonium formate | 4.6 | | | | | | | | | | |
| | Hypophosphorous acid | 0.4 | | | | | | | | | | |
| | n-nitroacetophenone | 1.0 | | | | | | | | | | |
| | Nitrobenzoic acid | 1.0 | | | | | | | | | | |
| Example 2 | Ethylene glycol | 20.0 | 26 | 1.1 | 4.4 | 1034 | 5.4 | 7.2 | 900 | 6.2 | 2.3 | |
| | Water | 60.0 | | | | | | | | | | |
| | Ammonium glutarate | 16.4 | | | | | | | | | | |
| | Sulfamic acid | 1.6 | | | | | | | | | | |
| | Nitrophenol | 1.0 | | | | | | | | | | |
| | n-nitroacetophenone | 1.0 | | | | | | | | | | |
| Example 3 | Ethylene glycol | 15.0 | 23 | 1.1 | 3.9 | 1025 | 5.3 | 7.0 | 902 | 6.1 | 2.0 | |
| | Water | 60.0 | | | | | | | | | | |
| | Ammonium adipate | 23.0 | | | | | | | | | | |
| | Nitrobenzoic acid | 1.0 | | | | | | | | | | |
| | Nitrophenol | 1.0 | | | | | | | | | | |
| Example 4 | Ethylene glycol | 22.0 | 21 | 1.1 | 3.8 | 1020 | 5.2 | 6.8 | 918 | 6.0 | 2.0 | |
| | Water | 50.0 | | | | | | | | | | |
| | Ammonium succinate | 25.0 | | | | | | | | | | |
| | Benzenesulfonic acid | 0.4 | | | | | | | | | | |
| | Nitrophenol | 2.6 | | | | | | | | | | |
| Example 5 | Ethylene glycol | 48.0 | 161 | 1.2 | 5.6 | 1024 | 8.7 | 6.2 | 932 | 9.5 | 1.9 | |
| | Water | 40.0 | | | | | | | | | | |
| | Ammonium borate | 11.0 | | | | | | | | | | |
| | Nitrobenzoic acid | 1.0 | | | | | | | | | | |
| Example 6 | Ethylene glycol | 54.0 | 29 | 1.0 | 3.7 | 1010 | 5.4 | 6.1 | 929 | 6.2 | 2.0 | |
| | Water | 30.0 | | | | | | | | | | |
| | Ammonium sulfamate | 14.6 | | | | | | | | | | |
| | Phosphoric acid | 0.4 | | | | | | | | | | |
| | n-nitroacetophenone | 1.0 | | | | | | | | | | |
| Example 7 | Ethylene glycol | 60.0 | 58 | 1.0 | 3.6 | 1003 | 6.2 | 6.3 | 933 | 7.0 | 2.1 | |
| | Water | 20.0 | | | | | | | | | | |
| | Ammonium adipate | 18.6 | | | | | | | | | | |
| | Boric acid | 0.4 | | | | | | | | | | |
| | Nitrobenzoic acid | 1.0 | | | | | | | | | | |
| Example 8 | Ethylene glycol | 62.0 | 94 | 1.0 | 3.8 | 1005 | 7.1 | 6.2 | 940 | 7.9 | 2.1 | |
| | Water | 27.0 | | | | | | | | | | |
| | Ammonium adipate | 9.0 | | | | | | | | | | |

TABLE 1-continued

| | | | Specific resistance | Ratio Z | | Initial value | | | After 3000 hours at 105° C. | | | |
|---|---|---|---|---|---|---|---|---|---|---|---|---|
| Example No. | Compositions of electrolytic solution (% by weight) | | at 30° C. [Ω · cm] | 120 Hz [−40/20° C.] | 100 kHz [−40/20° C.] | Capacitance [μF] | tan δ [%] | Leakage current [μA] | Capacitance [μF] | tan δ [%] | Leakage current [μA] | Appearance |
| Example 9 | Nitroacetophenone<br>Nitrophenol<br>Ethylene glycol<br>Water<br>Ammonium glutarate | 1.0<br>1.0<br>40.0<br>40.0<br>19.0 | 40 | 1.0 | 3.6 | 1018 | 5.8 | 6.4 | 937 | 6.4 | 2.2 | |
| Example 10 | Nitrobenzoic acid<br>Ethylene glycol<br>Water<br>Ammonium adipate<br>Sulfamic acid | 1.0<br>50.0<br>39.4<br>9.2<br>0.4 | 68 | 1.0 | 3.7 | 1013 | 6.4 | 6.4 | 942 | 7.0 | 2.3 | |
| Comp. Example 1 | Nitrophenol<br>Ethylene glycol<br>Water<br>Ammonium adipate | 1.0<br>60.0<br>30.0<br>10.0 | 85 | 1.3 | 36.1 | 1000 | 7.0 | 6.5 | | | | In all samples, operation of safety-vent was caused by gas evolution within 500 hours |
| Comp. Example 2 | Ethylene glycol<br>Water<br>Ammonium adipate | 45.0<br>40.0<br>15.0 | 40 | 1.1 | 9.7 | 1014 | 5.7 | 6.1 | | | | In all samples, operation of safety-vent was caused by gas evolution within 250 hours |
| Comp. Example 3 | Ethylene glycol<br>Water<br>Ammonium adipate | 30.0<br>50.0<br>20.0 | 20 | 1.0 | 7.9 | 1023 | 4.7 | 6.9 | | | | In all samples, operation of safety-vent was caused by gas evolution within 250 hours |

As is apparent from the results described in Table 1, the resistivity of the electrolytic solution except for Example 5 is almost the same as that of the Comparative Examples and the specific resistance is smaller than that of a conventional electrolytic solution. Although the specific resistance of the electrolytic solution of Example 5 shows a large value such as 161 Ω·cm, the electrolytic capacitor is substantially comparable with a conventional electrolytic capacitor and is suited for practical use when generally judged considering other characteristics. Accordingly, the electrolytic capacitor made by using the electrolytic solution of the present invention can realize a lower impedance than a conventional electrolytic capacitor, or can realize a low impedance which is equivalent to that of a conventional one.

It has been found that the electrolytic capacitor using the electrolytic solution of the present invention has a small ratio Z and that the ratio Z at a high frequency such as 100 kHz is particularly reduced as compared with those of the Comparative Examples. This fact shows that the electrolytic capacitor using the electrolytic solution of the present invention exhibits good low-temperature stability over a wide frequency range.

Particularly, the electrolytic capacitor using the electrolytic solution of the present invention shows stable characteristics under application of a rated voltage even after it was allowed to stand at high temperature (lapse of 3000 hours at 105° C.) by adding the nitro compound in the electrolytic solution in the amount ranging from 0.01 to 3% by weight, and the capacitor itself was not broken by gas generation. On the other hand, it became impossible to use all electrolytic capacitors of the Comparative Examples using the electrolytic solution containing no nitro compound because a safety-vent operated as a result of expansion of the case caused by hydrogen gas generation at an initial stage before a lapse of 3000 hours. This fact shows that a working life of the electrolytic capacitor can be easily prolonged according to the present invention.

Examples 11 to 19

The same procedure as in Example 1 was repeated, except that in this example compositions of the electrolytic solution were changed as described in Table 2 below to confirm the effect of simultaneous addition of a chelate compound and a nitro compound. As is summarized in Table 2 below, satisfactory results could be obtained. In Table 2 below, the test results of Comparative Examples 1 to 3 are also described.

TABLE 2

| | | | Specific resistance | Ratio Z | | Initial value | | | After 1000 hours at 105° C. | | | |
|---|---|---|---|---|---|---|---|---|---|---|---|---|
| Example No. | Compositions of electrolytic solution (% by weight) | | at 30° C. [Ω · cm] | 120 Hz [−40/20° C.] | 100 kHz [−40/20° C.] | Capacitance [μF] | tan δ [%] | Leakage current [μA] | Capacitance [μF] | tan δ [%] | Leakage current [μA] | Appearance |
| Comp. Example 1 | Ethylene glycol<br>Water<br>Ammonium adipate | 60.0<br>30.0<br>10.0 | 85 | 1.3 | 36.1 | 1008 | 7.0 | 6.5 | | | | In all samples, operation of safety-vent was caused by gas evolution within 500 hours |
| Comp. Example 2 | Ethylene glycol<br>Water<br>Ammonium adipate | 45.0<br>40.0<br>15.0 | 40 | 1.1 | 9.7 | 1014 | 5.7 | 6.1 | | | | In all samples, operation of safety-vent was caused by gas evolution within 250 hours |
| Comp. | Ethylene glycol | 30.0 | 20 | 1.0 | 7.9 | 1023 | 4.7 | 6.9 | | | | In all samples, operation of |

TABLE 2-continued

| Example No. | Compositions of electrolytic solution (% by weight) | | Specific resistance at 30° C. [Ω · cm] | Ratio Z 120 Hz [−40/20° C.] | Ratio Z 100 kHz [−40/20° C.] | Initial value Capacitance [μF] | Initial value tan δ [%] | Initial value Leakage current [μA] | After 1000 hours at 105° C. Capacitance [μF] | After 1000 hours at 105° C. tan δ [%] | After 1000 hours at 105° C. Leakage current [μA] | Appearance |
|---|---|---|---|---|---|---|---|---|---|---|---|---|
| Example 3 | Water<br>Ammonium adipate<br>Ethylene glycol | 50.0<br>20.0<br>25.0 | | | | | | | safety-vent was caused by gas evolution within 250 hours | | | |
| Example 11 | Water<br>Ammonium formate<br>Hypophophorous acid<br>p-nitrobenzoic acid<br>EDTA | 69.4<br>4.0<br>0.4<br>0.8<br>0.4 | 21 | 1.1 | 4.6 | 1044 | 5.2 | 7.8 | 919 | 5.8 | 2.5 | satisfactory |
| Example 12 | Ethylene glycol<br>Water<br>Ammonium glurarate<br>Sulfamic acid<br>Nitrophenol<br>EDTA | 20.0<br>59.2<br>17.8<br>1.6<br>1.0<br>0.4 | 26 | 1.1 | 4.4 | 1036 | 5.4 | 7.3 | 922 | 6.0 | 2.3 | satisfactory |
| Example 13 | Ethylene glycol<br>Water<br>Ammonium adipate<br>Dinitrobenzoic acid<br>EDDA | 15.0<br>58.7<br>24.4<br>1.5<br>0.4 | 23 | 1.1 | 3.9 | 1028 | 5.3 | 7.1 | 925 | 5.9 | 2.2 | satisfactory |
| Example 14 | Ethylene glycol<br>Water<br>Ammonium succinate<br>Benzenesulfonic acid<br>p-nitrobenzoic acid<br>DTPA | 24.2<br>50.0<br>24.2<br>0.4<br>0.8<br>0.4 | 21 | 1.1 | 3.8 | 1021 | 5.2 | 6.9 | 930 | 5.8 | 2.2 | satisfactory |
| Example 15 | Ethylene glycol<br>Water<br>Ammonium sulfamate<br>Phosphoric acid<br>Nitrophenol<br>EDTA | 55.0<br>28.0<br>14.0<br>2.0<br>0.6<br>0.4 | 29 | 1.0 | 3.7 | 1009 | 5.4 | 6.2 | 938 | 6.0 | 2.2 | satisfactory |
| Example 16 | Ethylene glycol<br>Water<br>Ammonium adipate<br>Boric acid<br>Nitroacetophene<br>EDDA | 59.2<br>20.0<br>19.0<br>0.4<br>1.0<br>0.4 | 57 | 1.0 | 3.6 | 1002 | 6.1 | 6.4 | 944 | 6.7 | 2.4 | satisfactory |
| Example 17 | Ethylene glycol<br>Water<br>Ammonium adipate<br>EDTPO<br>Nitrobenzoic acid<br>EDTA | 62.0<br>27.0<br>9.3<br>0.1<br>1.2<br>0.4 | 92 | 1.0 | 3.8 | 1003 | 7.0 | 6.5 | 942 | 7.6 | 2.4 | satisfactory |
| Example 18 | Ethylene glycol<br>Water<br>Ammonium glutarate<br>Nitrophenol<br>EDTPO | 38.8<br>40.0<br>19.6<br>1.2<br>0.4 | 39 | 1.0 | 3.6 | 1018 | 5.8 | 6.3 | 937 | 6.4 | 2.1 | satisfactory |
| Example 19 | Ethylene glycol<br>Water<br>Ammonium adipate<br>Sulfamic acid<br>Nitrophenol<br>EDDA | 48.8<br>40.0<br>9.2<br>0.4<br>1.2<br>0.4 | 68 | 1.0 | 3.7 | 1014 | 6.4 | 6.2 | 943 | 7.0 | 2.2 | satisfactory |

Examples 20 to 29

The same procedure as in Example 1 was repeated, except that in this example compositions of the electrolytic solution were changed as described in Table 3 below to confirm the effect of simultaneous addition of saccharides and a nitro compound. As is summarized in Table 3 below, satisfactory results could be obtained. In Table 3 below, the test results of Comparative Examples 1 to 3 are also described.

TABLE 3

| Example No. | Compositions of electrolytic solution (% by weight) | | Specific resistance at 30° C. [Ω·cm] | Ratio Z 120 Hz [−40/20° C.] | Ratio Z 100 kHz [−40/20° C.] | Initial value Capacitance [μF] | Initial value tan δ [%] | Initial value Leakage current [μA] | After 1000 hours at 105° C. Capacitance [μF] | After 1000 hours at 105° C. tan δ [%] | After 1000 hours at 105° C. Leakage current [μA] | Appearance |
|---|---|---|---|---|---|---|---|---|---|---|---|---|
| Comp. Example 1 | Ethylene glycol | 60.0 | 85 | 1.3 | 36.1 | 1008 | 7.0 | 6.5 | In all samples, operation of safety-vent was caused by gas evolution within 500 hours | | | |
| | Water | 30.0 | | | | | | | | | | |
| | Ammonium adipate | 10.0 | | | | | | | | | | |
| Comp. Example 2 | Ethylene glycol | 45.0 | 40 | 1.1 | 9.7 | 1014 | 5.7 | 6.1 | In all samples, operation of safety-vent was caused by gas evolution within 250 hours | | | |
| | Water | 40.0 | | | | | | | | | | |
| | Ammonium adipate | 15.0 | | | | | | | | | | |
| Comp. Example 3 | Ethylene glycol | 30.0 | 20 | 1.0 | 7.9 | 1023 | 4.7 | 6.9 | In all samples, operation of safety-vent was caused by gas evolution within 250 hours | | | |
| | Water | 50.0 | | | | | | | | | | |
| | Ammonium adipate | 20.0 | | | | | | | | | | |
| Example 20 | Ethylene glycol | 23.2 | 22 | 1.1 | 4.6 | 1043 | 5.3 | 7.7 | 918 | 5.9 | 2.5 | satisfactory |
| | Water | 70.0 | | | | | | | | | | |
| | Ammonium formate | 4.4 | | | | | | | | | | |
| | Galactose | 1.0 | | | | | | | | | | |
| | Nitrophenol | 1.0 | | | | | | | | | | |
| | Hypophosphorous acid | 0.4 | | | | | | | | | | |
| Example 21 | Ethylene glycol | 19.4 | 27 | 1.1 | 4.4 | 1035 | 5.4 | 7.2 | 921 | 6.0 | 2.3 | satisfactory |
| | Water | 60.0 | | | | | | | | | | |
| | Ammonium glutarate | 17.8 | | | | | | | | | | |
| | Fluctose | 1.0 | | | | | | | | | | |
| | Nitrobenzoic acid | 0.8 | | | | | | | | | | |
| | Sulfamic acid | 1.0 | | | | | | | | | | |
| Example 22 | Ethylene glycol | 14.2 | 24 | 1.1 | 3.9 | 1027 | 5.3 | 7.0 | 924 | 5.9 | 2.2 | satisfactory |
| | Water | 60.0 | | | | | | | | | | |
| | Ammonium adipate | 23.8 | | | | | | | | | | |
| | Dinitrobenzoic acid | 1.0 | | | | | | | | | | |
| | Xylose | 1.0 | | | | | | | | | | |
| Example 23 | Ethylene glycol | 20.8 | 22 | 1.1 | 3.8 | 1020 | 5.3 | 6.8 | 930 | 5.9 | 2.2 | satisfactory |
| | Water | 50.0 | | | | | | | | | | |
| | Ammonium succinate | 24.8 | | | | | | | | | | |
| | Glucose | 1.0 | | | | | | | | | | |
| | Nitrophenol | 3.0 | | | | | | | | | | |
| | Benzenesulfonic acid | 0.4 | | | | | | | | | | |
| Example 24 | Ethylene glycol | 48.7 | 162 | 1.2 | 5.6 | 1014 | 8.8 | 6.2 | 933 | 9.4 | 2.1 | satisfactory |
| | Water | 39.8 | | | | | | | | | | |
| | Ammonium borate | 9.0 | | | | | | | | | | |
| | Nitrophenol | 1.5 | | | | | | | | | | |
| | Xylose | 1.0 | | | | | | | | | | |
| Example 25 | Ethylene glycol | 53.2 | 30 | 1.0 | 3.7 | 1008 | 5.5 | 6.1 | 937 | 6.1 | 2.2 | satisfactory |
| | Water | 30.0 | | | | | | | | | | |
| | Ammonium sulfamate | 13.8 | | | | | | | | | | |
| | Fluctose | 1.0 | | | | | | | | | | |
| | Nitrobenzoic acid | 1.5 | | | | | | | | | | |
| | Phosphoric acid | 0.5 | | | | | | | | | | |
| Example 26 | Ethylene glycol | 59.2 | 59 | 1.0 | 3.6 | 1001 | 6.2 | 6.3 | 944 | 6.8 | 2.4 | satisfactory |
| | Water | 20.0 | | | | | | | | | | |
| | Ammonium adipate | 17.8 | | | | | | | | | | |
| | Glucose | 1.0 | | | | | | | | | | |
| | Dinitrobenzoic acid | 1.0 | | | | | | | | | | |
| | Boric acid | 1.0 | | | | | | | | | | |
| Example 27 | Ethylene glycol | 60.9 | 91 | 1.0 | 3.8 | 1002 | 7.0 | 6.2 | 944 | 7.6 | 2.4 | satisfactory |
| | Water | 28.0 | | | | | | | | | | |
| | Ammonium adipate | 9.3 | | | | | | | | | | |
| | Nitrobenzoic acid | 0.8 | | | | | | | | | | |
| | Fluctose | 1.0 | | | | | | | | | | |
| Example 28 | Ethylene glycol | 38.2 | 40 | 1.0 | 3.6 | 1018 | 5.8 | 6.3 | 937 | 6.4 | 2.1 | satisfactory |
| | Water | 40.0 | | | | | | | | | | |
| | Ammoniun glutarate | 18.8 | | | | | | | | | | |
| | Nitroacetophenone | 2.0 | | | | | | | | | | |
| | Galactose | 1.0 | | | | | | | | | | |
| Example 29 | Ethylene glycol | 47.7 | 69 | 1.0 | 3.7 | 1013 | 6.4 | 6.2 | 942 | 7.0 | 2.2 | satisfactory |
| | Water | 39.4 | | | | | | | | | | |
| | Ammonium adipate | 9.0 | | | | | | | | | | |
| | Sulfamic acid | 0.4 | | | | | | | | | | |
| | Nitrobenzoic acid | 2.5 | | | | | | | | | | |
| | Xylose | 1.0 | | | | | | | | | | |

Examples 30 to 39

The same procedure as in Example 1 was repeated, except that in this example compositions of the electrolytic solution were changed as described in Table 4 below to confirm the effect of simultaneous addition of hydroxybenzyl alcohol, glutamic-diacetic acid and the like as well as a nitro compound. As is summarized in Table 4 below, satisfactory results could be obtained. In Table 4 below, the test results of Comparative Examples 1 to 3 are also described.

TABLE 4

| Example No. | Compositions of electrolytic solution (% by weight) | | Specific resistance at 30° C. [Ω·cm] | Ratio Z 120 Hz [−40/20° C.] | Ratio Z 100 kHz [−40/20° C.] | Initial value Capacitance [μF] | Initial value tan δ [%] | Initial value Leakage current [μA] | After 1000 hours at 105° C. Capacitance [μF] | After 1000 hours at 105° C. tan δ [%] | After 1000 hours at 105° C. Leakage current [μA] | Appearance |
|---|---|---|---|---|---|---|---|---|---|---|---|---|
| Comp. Example 1 | Ethylene glycol<br>Water<br>Ammonium adipate | 60.0<br>30.0<br>10.0 | 85 | 1.3 | 36.1 | 1008 | 7.0 | 6.5 | In all samples, operation of safety-vent was caused by gas evolution within 500 hours | | | |
| Comp. Example 2 | Ethylene glycol<br>Water<br>Ammonium adipate | 45.0<br>40.0<br>15.0 | 40 | 1.1 | 9.7 | 1014 | 5.7 | 6.1 | In all samples, operation of safety-vent was caused by gas evolution within 250 hours | | | |
| Comp. Example 3 | Ethylene glycol<br>Water<br>Ammonium adipate | 30.0<br>50.0<br>20.0 | 20 | 1.0 | 7.9 | 1023 | 4.7 | 6.9 | In all samples, operation of safety-vent was caused by gas evolution within 250 hours | | | |
| Example 30 | Ethylene glycol<br>Water<br>Ammonium formate<br>Hypophosphorous acid<br>Dinitrobenzoic acid<br>Hydroxybenzyl alcohol | 24.0<br>68.0<br>4.4<br>0.4<br>1.2<br>2.0 | 21 | 1.1 | 4.6 | 1044 | 5.2 | 7.7 | 919 | 5.8 | 2.5 | satisfactory |
| Example 31 | Ethylene glycol<br>Water<br>Ammonium glutarate<br>Sulfamic acid<br>Nitrophenol<br>Glutamic-diacetic acid | 17.7<br>60.0<br>16.8<br>1.6<br>2.5<br>1.4 | 27 | 1.1 | 4.4 | 1034 | 5.4 | 7.2 | 920 | 6.0 | 2.3 | satisfactory |
| Example 32 | Ethylene glycol<br>Water<br>Ammonium adipate<br>Nitrobenzoic acid<br>Glutamic-diacetic acid | 14.2<br>60.0<br>23.4<br>1.0<br>1.4 | 24 | 1.1 | 3.9 | 1025 | 5.3 | 7.0 | 923 | 5.9 | 2.2 | satisfactory |
| Example 33 | Ethylene glycol<br>Water<br>Ammonium succinate<br>Benzosulfonic acid<br>Nitrobenzoic acid<br>Hydrobenzyl alcohol | 20.8<br>50.0<br>24.8<br>0.4<br>2.0<br>2.0 | 22 | 1.1 | 3.8 | 1020 | 5.3 | 6.8 | 930 | 5.9 | 2.2 | satisfactory |
| Example 34 | Ethylene glycol<br>Water<br>Ammonium borate<br>Dinitrobenzoic acid<br>Hydroxybenzyl alcohol | 44.7<br>40.0<br>9.8<br>1.5<br>4.0 | 161 | 1.2 | 5.6 | 1024 | 8.7 | 6.2 | 942 | 9.3 | 2.1 | satisfactory |
| Example 35 | Ethylene glycol<br>Water<br>Ammonium sulfamate<br>Phosphoric acid<br>Nitroacetophenone<br>Glutamic-diacetic acid | 52.2<br>30.0<br>13.8<br>0.4<br>1.0<br>2.6 | 30 | 1.0 | 3.7 | 1010 | 5.5 | 6.1 | 939 | 6.1 | 2.2 | satisfactory |
| Example 36 | Ethylene glycol<br>Water<br>Ammonium adipate<br>Nitrophenol<br>Hydroxybenzyl alcohol<br>Glutamic-diacetic acid | 57.2<br>20.0<br>15.0<br>3.0<br>2.6<br>2.2 | 63 | 1.0 | 3.6 | 1003 | 6.3 | 6.3 | 944 | 6.9 | 2.4 | satisfactory |
| Example 37 | Ethylene glycol<br>Water | 59.2<br>27.0 | 95 | 1.0 | 3.8 | 1005 | 7.1 | 6.2 | 944 | 7.7 | 2.4 | satisfactory |

TABLE 4-continued

| Example No. | Compositions of electrolytic solution (% by weight) | | Specific resistance at 30° C. [Ω · cm] | Ratio Z 120 Hz [−40/ 20° C.] | Ratio Z 100 kHz [−40/ 20° C.] | Initial value Capacitance [μF] | Initial value tan δ [%] | Initial value Leakage current [μA] | After 1000 hours at 105° C. Capacitance [μF] | After 1000 hours at 105° C. tan δ [%] | After 1000 hours at 105° C. Leakage current [μA] | Appearance |
|---|---|---|---|---|---|---|---|---|---|---|---|---|
| | Ammonium adipate | 9.3 | | | | | | | | | | |
| | Dinitrobenzoic acid | 1.5 | | | | | | | | | | |
| | Ammonium glutarate | 1.5 | | | | | | | | | | |
| | Glutamic-diacetic acid | 1.5 | | | | | | | | | | |
| Example 38 | Ethylene glycol | 39.6 | 39 | 1.0 | 3.6 | 1018 | 5.8 | 6.3 | 937 | 6.4 | 2.1 | satisfactory |
| | Water | 40.0 | | | | | | | | | | |
| | Ammonium glutarate | 19.0 | | | | | | | | | | |
| | Nitrophenol | 0.4 | | | | | | | | | | |
| | Hydroxybenzyl alcohol | 1.0 | | | | | | | | | | |
| Example 39 | Ethylene glycol | 48.7 | 68 | 1.0 | 3.7 | 1013 | 6.4 | 6.4 | 942 | 7.0 | 2.3 | satisfactory |
| | Water | 39.4 | | | | | | | | | | |
| | Ammonium adipate | 9.0 | | | | | | | | | | |
| | Sulfamic acid | 0.4 | | | | | | | | | | |
| | Dinitrobenzoic acid | 1.5 | | | | | | | | | | |
| | Hydroxybenzyl alcohol | 1.0 | | | | | | | | | | |

Examples 40 to 49

The same procedure as in Example 1 was repeated, except that in this example compositions of the electrolytic solution were changed as described in Table 5 below to confirm the effect of simultaneous addition of a nitro compound and gluconic lactone. As is summarized in Table 5 below, satisfactory results could be obtained. In Table 5 below, the test results of Comparative Examples 1 to 3 are also described.

TABLE 5

| Example No. | Compositions of electrolytic solution (% by weight) | | Specific resistance at 30° C. [Ω · cm] | Ratio Z 120 Hz [−40/ 20° C.] | Ratio Z 100 kHz [−40/ 20° C.] | Initial value Capacitance [μF] | Initial value tan δ [%] | Initial value Leakage current [μA] | After 3000 hours at 105° C. Capacitance [μF] | After 3000 hours at 105° C. tan δ [%] | After 3000 hours at 105° C. Leakage current [μA] | Appearance |
|---|---|---|---|---|---|---|---|---|---|---|---|---|
| Comp. Example 1 | Ethylene glycol | 60.0 | 85 | 1.3 | 36.1 | 1008 | 7.0 | 6.5 | In all samples, operation of safety-vent was caused by gas evolution within 500 hours | | | |
| | Water | 30.0 | | | | | | | | | | |
| | Ammonium adipate | 10.0 | | | | | | | | | | |
| Comp. Example 2 | Ethylene glycol | 45.0 | 40 | 1.1 | 9.7 | 1014 | 5.7 | 6.1 | In all samples, operation of safety-vent was caused by gas evolution within 250 hours | | | |
| | Water | 40.0 | | | | | | | | | | |
| | Ammonium adipate | 15.0 | | | | | | | | | | |
| Comp. Example 3 | Ethylene glycol | 30.0 | 20 | 1.0 | 7.9 | 1023 | 4.7 | 6.9 | In all samples, operation of safety-vent was caused by gas evolution within 250 hours | | | |
| | Water | 50.0 | | | | | | | | | | |
| | Ammonium adipate | 20.0 | | | | | | | | | | |
| Example 40 | Ethylene glycol | 25.0 | 28 | 1.1 | 4.6 | 1044 | 5.6 | 7.7 | 898 | 6.4 | 2.3 | satisfactory |
| | Water | 68.0 | | | | | | | | | | |
| | Ammonium formate | 4.4 | | | | | | | | | | |
| | Hypophosphorous acid | 0.4 | | | | | | | | | | |
| | Gluconic lactone | 0.2 | | | | | | | | | | |
| | n-nitroacetophenone | 1.0 | | | | | | | | | | |
| | n-nitrobenzoic acid | 1.0 | | | | | | | | | | |
| Example 41 | Ethylene glycol | 20.0 | 26 | 1.1 | 4.4 | 1034 | 5.5 | 7.2 | 900 | 6.3 | 2.3 | satisfactory |
| | Water | 60.0 | | | | | | | | | | |
| | Ammonium glutarate | 16.2 | | | | | | | | | | |
| | Sulfamic acid | 1.6 | | | | | | | | | | |
| | Gluconic lactone | 0.2 | | | | | | | | | | |
| | Nitrophenol | 1.0 | | | | | | | | | | |
| | n-nitroacetophenone | 1.0 | | | | | | | | | | |
| Example 42 | Ethylene glycol | 15.0 | 23 | 1.1 | 3.9 | 1025 | 5.4 | 7.0 | 902 | 6.2 | 2.0 | satisfactory |
| | Water | 60.0 | | | | | | | | | | |
| | Ammonium adipate | 22.8 | | | | | | | | | | |
| | Gluconic lactone | 0.2 | | | | | | | | | | |
| | Nitrobenzoic acid | 1.0 | | | | | | | | | | |
| | Nitrophenol | 1.0 | | | | | | | | | | |
| Example | Ethylene glycol | 22.0 | 21 | 1.1 | 3.8 | 1020 | 5.2 | 6.8 | 918 | 6.0 | 2.0 | satisfactory |

TABLE 5-continued

| Example No. | Compositions of electrolytic solution (% by weight) | | Specific resistance at 30° C. [Ω · cm] | Ratio Z 120 Hz [−40/ 20° C.] | Ratio Z 100 kHz [−40/ 20° C.] | Initial value Capacitance [μF] | Initial value tan δ [%] | Initial value Leakage current [μA] | After 3000 hours at 105° C. Capacitance [μF] | After 3000 hours at 105° C. tan δ [%] | After 3000 hours at 105° C. Leakage current [μA] | Appearance |
|---|---|---|---|---|---|---|---|---|---|---|---|---|
| 43 | Water | 50.0 | | | | | | | | | | |
| | Ammonium succinate | 25.0 | | | | | | | | | | |
| | Benzenesulfonic acid | 0.4 | | | | | | | | | | |
| | Gluconic lactone | 0.2 | | | | | | | | | | |
| | Nitrophenol | 2.6 | | | | | | | | | | |
| Example 44 | Ethylene glycol | 48.0 | 161 | 1.2 | 5.6 | 1024 | 8.8 | 6.2 | 932 | 9.6 | 1.9 | satisfactory |
| | Water | 40.0 | | | | | | | | | | |
| | Ammonium borate | 10.8 | | | | | | | | | | |
| | Gluconic lactone | 0.2 | | | | | | | | | | |
| | Nitrobenzoic acid | 1.0 | | | | | | | | | | |
| Example 45 | Ethylene glycol | 54.0 | 29 | 1.0 | 3.7 | 1010 | 5.6 | 6.1 | 929 | 6.4 | 2.0 | satisfactory |
| | Water | 30.0 | | | | | | | | | | |
| | Ammonium sulfamate | 14.4 | | | | | | | | | | |
| | Phosphoric acid | 0.4 | | | | | | | | | | |
| | Gluconic lactone | 0.2 | | | | | | | | | | |
| | n-nitroacetophenone | 1.0 | | | | | | | | | | |
| Example 46 | Ethylene glycol | 60.0 | 58 | 1.0 | 3.6 | 1003 | 6.2 | 6.3 | 933 | 7.0 | 2.1 | satisfactory |
| | Water | 20.0 | | | | | | | | | | |
| | Ammonium adipate | 16.4 | | | | | | | | | | |
| | Boric acid | 0.4 | | | | | | | | | | |
| | Gluconic lactone | 0.2 | | | | | | | | | | |
| | Nitrobenzoic acid | 1.0 | | | | | | | | | | |
| Example 47 | Ethylene glycol | 62.0 | 95 | 1.0 | 3.8 | 1005 | 6.9 | 6.2 | 940 | 7.7 | 2.1 | satisfactory |
| | Water | 27.0 | | | | | | | | | | |
| | Ammonium adipate | 6.8 | | | | | | | | | | |
| | Gluconic lactone | 0.2 | | | | | | | | | | |
| | n-nitroacetophenone | 1.0 | | | | | | | | | | |
| | Nitrophenol | 1.0 | | | | | | | | | | |
| Example 48 | Ethylene glycol | 40.0 | 40 | 1.0 | 3.6 | 1018 | 5.8 | 6.3 | 937 | 6.4 | 2.2 | satisfactory |
| | Water | 40.0 | | | | | | | | | | |
| | Ammonium glutarate | 18.8 | | | | | | | | | | |
| | Gluconic lactone | 0.2 | | | | | | | | | | |
| | Nitrobenzoic acid | 1.0 | | | | | | | | | | |
| Example 49 | Ethylene glycol | 50.0 | 68 | 1.0 | 3.7 | 1013 | 6.5 | 6.4 | 942 | 7.1 | 2.3 | satisfactory |
| | Water | 39.4 | | | | | | | | | | |
| | Ammonium adipate | 9.0 | | | | | | | | | | |
| | Sulfamic acid | 0.4 | | | | | | | | | | |
| | Gluconic lactone | 0.2 | | | | | | | | | | |
| | Nitrophenol | 1.0 | | | | | | | | | | |

Examples 50 to 59

The same procedure as in Example 1 was repeated, except that in this example compositions of the electrolytic solution were changed as described in Table 6 below to confirm the effect obtained by an arbitrary combination of various additives. As is summarized in Table 6 below, satisfactory results could be obtained. In Table 6 below, the test results of Comparative Examples 1 to 3 are also described.

TABLE 6

| Example No. | Compositions of electrolytic solution (% by weight) | | Specific resistance at 30° C. [Ω · cm] | Ratio Z 120 Hz [−40/ 20° C.] | Ratio Z 100 kHz [−40/ 20° C.] | Initial value Capacitance [μF] | Initial value tan δ [%] | Initial value Leakage current [μA] | After 3000 hours at 105° C. Capacitance [μF] | After 3000 hours at 105° C. tan δ [%] | After 3000 hours at 105° C. Leakage current [μA] | Appearance |
|---|---|---|---|---|---|---|---|---|---|---|---|---|
| Comp. Example 1 | Ethylene glycol | 60.0 | 85 | 1.3 | 36.1 | 1008 | 7.0 | 6.5 | In all samples, operation of safety-vent was caused by gas evolution within 500 hours | | | |
| | Water | 30.0 | | | | | | | | | | |
| | Ammonium adipate | 10.0 | | | | | | | | | | |
| Comp. Example 2 | Ethylene glycol | 45.0 | 40 | 1.1 | 9.7 | 1014 | 5.7 | 6.1 | In all samples, operation of safety-vent was caused by gas evolution within 250 hours | | | |
| | Water | 40.0 | | | | | | | | | | |
| | Ammonium adipate | 15.0 | | | | | | | | | | |
| Comp. Example 3 | Ethylene glycol | 30.0 | 20 | 1.0 | 7.9 | 1023 | 4.7 | 6.9 | In all samples, operation of safety-vent was caused by gas evolution within 250 hours | | | |
| | Water | 50.0 | | | | | | | | | | |
| | Ammonium adipate | 20.0 | | | | | | | | | | |
| Example 50 | Ethylene glycol | 24.0 | 28 | 1.1 | 4.6 | 1044 | 5.3 | 7.7 | 898 | 6.1 | 2.3 | satisfactory |
| | Water | 68.0 | | | | | | | | | | |

TABLE 6-continued

| Example No. | Compositions of electrolytic solution (% by weight) | | Specific resistance at 30° C. [Ω · cm] | Ratio Z 120 Hz [−40/20° C.] | Ratio Z 100 kHz [−40/20° C.] | Initial value Capacitance [μF] | Initial value tan δ [%] | Initial value Leakage current [μA] | After 3000 hours at 105° C. Capacitance [μF] | After 3000 hours at 105° C. tan δ [%] | After 3000 hours at 105° C. Leakage current [μA] | Appearance |
|---|---|---|---|---|---|---|---|---|---|---|---|---|
| | Ammonium formate | 4.4 | | | | | | | | | | |
| | Hypophosphorous acid | 0.4 | | | | | | | | | | |
| | EDTA | 0.5 | | | | | | | | | | |
| | Glutamic-diacetic acid | 0.2 | | | | | | | | | | |
| | Gluconic lactone | 0.2 | | | | | | | | | | |
| | n-nitroacetophenone | 1.0 | | | | | | | | | | |
| | Nitrobenzoic acid | 1.0 | | | | | | | | | | |
| Example 51 | Ethylene glycol | 18.0 | 26 | 1.1 | 4.4 | 1034 | 5.2 | 7.2 | 900 | 6.0 | 2.3 | satisfactory |
| | Water | 60.0 | | | | | | | | | | |
| | Ammonium glutarate | 16.2 | | | | | | | | | | |
| | Sulfamic acid | 1.6 | | | | | | | | | | |
| | DTPA | 1.0 | | | | | | | | | | |
| | Fluctose | 1.0 | | | | | | | | | | |
| | Gluconic lactone | 0.2 | | | | | | | | | | |
| | Nitrophenol | 1.0 | | | | | | | | | | |
| | n-nitroacetophenone | 1.0 | | | | | | | | | | |
| Example 52 | Ethylene glycol | 15.0 | 23 | 1.1 | 3.9 | 1025 | 5.5 | 7.0 | 902 | 6.3 | 2.0 | satisfactory |
| | Water | 57.5 | | | | | | | | | | |
| | Ammonium adipate | 22.8 | | | | | | | | | | |
| | EDTA | 2.0 | | | | | | | | | | |
| | Hydroxybenzyl alcohol | 0.5 | | | | | | | | | | |
| | Gluconic lactone | 0.2 | | | | | | | | | | |
| | Nitrobenzoic acid | 1.0 | | | | | | | | | | |
| | Nitrophenol | 1.0 | | | | | | | | | | |
| Example 53 | Ethylene glycol | 20.6 | 21 | 1.1 | 3.8 | 1020 | 5.4 | 6.8 | 918 | 6.2 | 2.0 | satisfactory |
| | Water | 50.0 | | | | | | | | | | |
| | Ammonium succinate | 25.0 | | | | | | | | | | |
| | EDDA | 1.0 | | | | | | | | | | |
| | Glutamic-diacetic acid | 0.2 | | | | | | | | | | |
| | Benzenesulfonic acid | 0.4 | | | | | | | | | | |
| | Gluconic lactone | 0.2 | | | | | | | | | | |
| | Nitrophenol | 2.6 | | | | | | | | | | |
| Example 54 | Ethylene glycol | 46.7 | 161 | 1.2 | 5.6 | 1024 | 8.9 | 6.2 | 932 | 9.7 | 1.9 | satisfactory |
| | Water | 40.0 | | | | | | | | | | |
| | Ammonium borate | 10.8 | | | | | | | | | | |
| | EDDA | 0.8 | | | | | | | | | | |
| | Hydroxybenzyl alcohol | 0.5 | | | | | | | | | | |
| | Gluconic lactone | 0.2 | | | | | | | | | | |
| | Nitrobenzoic acid | 1.0 | | | | | | | | | | |
| Example 55 | Ethylene glycol | 52.0 | 29 | 1.0 | 3.7 | 1010 | 5.2 | 6.1 | 929 | 6.0 | 2.0 | satisfactory |
| | Water | 30.0 | | | | | | | | | | |
| | Ammonium sulfamate | 14.4 | | | | | | | | | | |
| | Xylose | 0.5 | | | | | | | | | | |
| | EDTPO | 1.0 | | | | | | | | | | |
| | Glutamic-diacetic acid | 0.5 | | | | | | | | | | |
| | Phosphoric acid | 0.4 | | | | | | | | | | |
| | Gluconic lactone | 0.2 | | | | | | | | | | |
| | n-nitroacetophenone | 1.0 | | | | | | | | | | |
| Example 56 | Ethylene glycol | 57.5 | 58 | 1.0 | 3.6 | 1003 | 6.1 | 6.3 | 933 | 6.9 | 2.1 | satisfactory |
| | Water | 20.0 | | | | | | | | | | |
| | Ammonium adipate | 18.4 | | | | | | | | | | |
| | EDTA | 1.5 | | | | | | | | | | |
| | Hydroxybenzyl alcohol | 0.5 | | | | | | | | | | |
| | Glutamic-diacetic acid | 0.5 | | | | | | | | | | |
| | Boric acid | 0.4 | | | | | | | | | | |
| | Gluconic lactone | 0.2 | | | | | | | | | | |
| | Nitrobenzoic acid | 1.0 | | | | | | | | | | |
| Example 57 | Ethylene glycol | 57.5 | 95 | 1.0 | 3.8 | 1005 | 6.0 | 6.2 | 940 | 7.6 | 2.1 | satisfactory |
| | Water | 27.0 | | | | | | | | | | |
| | Ammonium adipate | 8.8 | | | | | | | | | | |
| | DTPA | 3.0 | | | | | | | | | | |

TABLE 6-continued

| Example No. | Compositions of electrolytic solution (% by weight) | | Specific resistance at 30° C. [Ω · cm] | Ratio Z 120 Hz [−40/20° C.] | Ratio Z 100 kHz [−40/20° C.] | Initial value Capacitance [μF] | Initial value tan δ [%] | Initial value Leakage current [μA] | After 3000 hours at 105° C. Capacitance [μF] | After 3000 hours at 105° C. tan δ [%] | After 3000 hours at 105° C. Leakage current [μA] | Appearance |
|---|---|---|---|---|---|---|---|---|---|---|---|---|
| Example 58 | Glucose | 1.0 | 40 | 1.0 | 3.6 | 1018 | 4.8 | 6.4 | 937 | 5.4 | 2.2 | satisfactory |
| | Hydroxybenzyl alcohol | 6.5 | | | | | | | | | | |
| | Gluconic lactone | 0.2 | | | | | | | | | | |
| | n-nitroacetophenone | 1.0 | | | | | | | | | | |
| | Nitrophenol | 1.0 | | | | | | | | | | |
| | Ethylene glycol | 37.9 | | | | | | | | | | |
| | Water | 40.0 | | | | | | | | | | |
| | EDDA | 1.0 | | | | | | | | | | |
| | Fluctose | 0.5 | | | | | | | | | | |
| | Glutamic-diacetic acid | 0.6 | | | | | | | | | | |
| | Ammonium glutarate | 18.8 | | | | | | | | | | |
| | Gluconic lactone | 0.2 | | | | | | | | | | |
| | Nitrobenzoic acid | 1.0 | | | | | | | | | | |
| Example 59 | Ethylene glycol | 47.5 | 68 | 1.0 | 3.7 | 1013 | 6.8 | 6.4 | 942 | 7.4 | 2.3 | satisfactory |
| | Water | 39.4 | | | | | | | | | | |
| | Ammonium adipate | 9.0 | | | | | | | | | | |
| | Hydroxybenzyl alcohol | 1.0 | | | | | | | | | | |
| | EDTPO | 1.0 | | | | | | | | | | |
| | Fluctose | 0.5 | | | | | | | | | | |
| | Sulfamic acid | 0.4 | | | | | | | | | | |
| | Gluconic lactone | 0.2 | | | | | | | | | | |
| | Nitrophenol | 1.0 | | | | | | | | | | |

Comparative Examples 4 to 6 and Examples 60 to 62

The same procedure as in Example 1 was repeated, except that in this example the measurement of the characteristic value under high temperature conditions (application of rated voltage, lapse of 1000 hours at 105° C.) employed in Example 1 was conducted under conditions (lapse of 6000 hours at 105° C.) to confirm a further improvement in characteristics of working life. The results as described in Table 7 below were obtained.

TABLE 7

| Example No. | Compositions of electrolytic solution (% by weight) | | Specific resistance at 30° C. [Ω · cm] | Ratio Z 120 Hz [−40/20° C.] | Ratio Z 100 kHz [−40/20° C.] | Initial value Capacitance [μF] | Initial value tan δ [%] | Initial value Leakage current [μA] | After 6000 hours at 105° C. Capacitance [μF] | After 6000 hours at 105° C. tan δ [%] | After 6000 hours at 105° C. Leakage current [μA] | Appearance |
|---|---|---|---|---|---|---|---|---|---|---|---|---|
| Comp. Example 4 | Ethylene glycol | 60.0 | 85 | 1.3 | 36.1 | 1008 | 7.0 | 6.5 | In all samples, operation of safety-vent was caused by gas evolution within 500 hours | | | |
| | Water | 30.0 | | | | | | | | | | |
| | Ammonium adipate | 10.0 | | | | | | | | | | |
| Comp. Example 5 | Ethylene glycol | 45.0 | 40 | 1.1 | 9.7 | 1014 | 5.7 | 6.1 | In all samples, operation of safety-vent was caused by gas evolution within 250 hours | | | |
| | Water | 40.0 | | | | | | | | | | |
| | Ammonium adipate | 15.0 | | | | | | | | | | |
| Comp. Example 6 | Ethylene glycol | 30.0 | 20 | 1.0 | 7.9 | 1023 | 4.7 | 6.9 | In all samples, operation of safety-vent was caused by gas evolution within 250 hours | | | |
| | Water | 50.0 | | | | | | | | | | |
| | Ammonium adipate | 20.0 | | | | | | | | | | |
| Example 60 | Ethylene glycol | 25.0 | 28 | 1.1 | 4.6 | 1044 | 5.4 | 7.7 | 855 | 6.6 | 2.1 | satisfactory |
| | Water | 68.0 | | | | | | | | | | |
| | Ammonium formate | 4.6 | | | | | | | | | | |
| | Hypophosphorous acid | 0.4 | | | | | | | | | | |
| | n-nitroacetophenone | 1.0 | | | | | | | | | | |
| | Nitrobenzoic acid | 1.0 | | | | | | | | | | |
| Example 61 | Ethylene glycol | 15.0 | 23 | 1.1 | 3.9 | 1025 | 5.3 | 7.0 | 668 | 8.2 | 1.6 | satisfactory |
| | Water | 60.0 | | | | | | | | | | |
| | Ammonium adipate | 23.0 | | | | | | | | | | |
| | Nitrobenzoic acid | 1.0 | | | | | | | | | | |
| | Nitrophenol | 1.0 | | | | | | | | | | |
| Example 62 | Ethylene glycol | 40.0 | 40 | 1.0 | 3.6 | 1018 | 5.8 | 6.4 | 632 | 9.1 | 1.1 | satisfactory |
| | Water | 40.0 | | | | | | | | | | |
| | Ammonium glutarate | 19.0 | | | | | | | | | | |
| | Nitrobenzoic acid | 1.0 | | | | | | | | | | |

In Table 7, Comparative Examples 4 to 6 respectively correspond to Comparative Examples 1 to 3, while Examples 60 to 62 respectively correspond to Examples 1, 3 and 9. As is apparent from the results, it becomes impossible to use all capacitors of Comparative Examples 4 to 6 using an electrolytic solution having added thereto no nitro compound, whereas, capacitors of Examples 60 to 62 could be used even after 6000 hours had passed although a reduction in capacitance was recognized. Surprisingly, it has been found that characteristics of working life of the electrolytic capacitor are further improved by using a carboxylic acid or a salt thereof as an organic electrolyte in combination with an inorganic acid as an inorganic electrolyte.

Industrial Applicability

As described above, according to the present invention, there is provided an electrolytic solution, for use in an electrolytic capacitor, which has a low impedance and excellent low-temperature stability expressed by an a ratio of an impedance at low temperature to that at normal temperature, along with good characteristics of working life, and also it can exhibit an excellent hydrogen gas absorption function when an electrolytic solution contains a highly increased amount of water in its mixed solvent or when an electrolytic capacitor is used under high temperature conditions. According to the present invention, there is also provided an electrolytic capacitor with high reliability, which has a low impedance and excellent low-temperature stability, along with good characteristics of working life, and also it is free from defects due to presence of water used as a solvent, specially an aluminum electrolytic capacitor.

What is claimed is:

1. An electrolytic solution for use in an electrolytic capacitor, comprising a solvent consisting of 20 to 80% by weight of an organic solvent and 80 to 20% by weight of water, and at least one electrolyte selected from the group consisting of a carboxylic acid or a salt thereof and an inorganic acid or a salt thereof, having added thereto at least one nitro compound selected from the group consisting of nitrophenol, nitrobenzoic acid, dinitrobenzoic acid, nitroacetophenone and nitroanisole, said electrolytic solution being contained between a wound anode foil and a wound cathode foil opposed to the anode foil of said electrolytic capacitor.

2. The electrolytic solution for use in an electrolytic capacitor according to claim 1, wherein the nitro compound is a combination of two or more nitro compounds.

3. The electrolytic solution for use in an electrolytic capacitor according to claim 1, wherein the nitro compound is added in the amount of 0.01 to 5% by weight based on the total amount of the electrolytic solution.

4. The electrolytic solution for use in an electrolytic capacitor according to claim 1, wherein the organic solvent is a protic solvent, an aprotic solvent, or a mixture thereof.

5. The electrolytic solution for use in an electrolytic capacitor according to claim 1, wherein the carboxylic acid or salt thereof is selected from the group consisting of formic acid, acetic acid, propionic acid, butyric acid, p-nitrobenzoic acid, salicylic acid, benzoic acid, oxalic acid, malonic acid, succinic acid, glutaric acid, adipic acid, fumaric acid, maleic acid, phthalic acid, azelaic acid, citric acid and hydroxybutyric acid, as well as ammonium, sodium, potassium, amine and alkyl ammonium salts thereof.

6. The electrolytic solution for use in an electrolytic capacitor according to claim 1, wherein the inorganic acid or salt thereof is selected from the group consisting of phosphoric acid, phosphorous acid, hypophosphorous acid, boric acid, sulfamic acid, as well as ammonium, sodium, potassium, amine and alkyl ammonium salts thereof.

7. The electrolytic solution for use in an electrolytic capacitor according to claim 1, further comprising at least one additive selected from the group consisting of the following group:

(1) a chelate compound,
(2) saccharides,
(3) hydroxybenzyl alcohol and/or L-glutamic-diacetic acid or a salt thereof, and
(4) gluconic acid and/or gluconic lactone.

8. An electrolytic capacitor comprising a capacitor element formed of a wound anode foil, a wound cathode foil opposed to the anode foil and a separator disposed between the anode foil and the cathode foil, and a electrolytic solution contained between the anode foil and the cathode foil, said electrolytic solution containing a solvent consisting of 20 to 80% by weight of an organic solvent and 80 to 20% by weight of water, and at least one electrolyte selected from the group consisting of a carboxylic acid or a salt thereof and an inorganic acid or a salt thereof, having added thereto at least one nitro compound selected from the group consisting of nitrophenol, nitrobenzoic acid, dinitrobenzoic acid, nitroacetophenone and nitroanisole.

9. The electrolytic capacitor according to claim 8, wherein the nitro compound is a combination of two or more nitro compounds.

10. The electrolytic capacitor according to claim 8, wherein the nitro compound is added in the amount of 0.01 to 5% by weight based on the total amount of the electrolytic solution.

* * * * *